United States Patent
Ishii

(10) Patent No.: US 7,995,172 B2
(45) Date of Patent: Aug. 9, 2011

(54) SEMITRANSPARENT LIQUID CRYSTAL DISPLAY

(75) Inventor: Toshiya Ishii, Kanagawa (JP)

(73) Assignee: NEC LCD Technologies, Ltd., Kawasaki-shi, Kanagawa (JP)

( * ) Notice: Subject to any disclaimer, the term of this patent is extended or adjusted under 35 U.S.C. 154(b) by 212 days.

(21) Appl. No.: 12/227,848

(22) PCT Filed: May 31, 2007

(86) PCT No.: PCT/JP2007/061128
§ 371 (c)(1),
(2), (4) Date: Jan. 8, 2009

(87) PCT Pub. No.: WO2007/139198
PCT Pub. Date: Dec. 6, 2007

(65) Prior Publication Data
US 2009/0310070 A1  Dec. 17, 2009

(30) Foreign Application Priority Data

May 31, 2006  (JP) ................................. 2006-150975

(51) Int. Cl.
*G02F 1/1343* (2006.01)
*G02F 1/136* (2006.01)
*G02F 1/1335* (2006.01)
*G02F 1/1345* (2006.01)

(52) U.S. Cl. .......... 349/114; 349/44; 349/143; 349/147

(58) Field of Classification Search .............. 349/38–39, 349/44, 110, 114, 143, 147
See application file for complete search history.

(56) References Cited

U.S. PATENT DOCUMENTS

| | | | |
|---|---|---|---|
| 5,847,781 A | 12/1998 | Ono et al. | |
| 7,110,068 B2 * | 9/2006 | Asuma et al. | 349/110 |
| 2002/0057391 A1 * | 5/2002 | Nakamura | 349/39 |
| 2005/0190315 A1 | 9/2005 | Asuma et al. | |

FOREIGN PATENT DOCUMENTS

| | | |
|---|---|---|
| CN | 1477431 A | 2/2004 |
| JP | 9-33961 | 2/1997 |
| JP | 2004-61891 | 2/2004 |
| JP | 2005-91819 | 4/2005 |

\* cited by examiner

*Primary Examiner* — Dung T. Nguyen
(74) *Attorney, Agent, or Firm* — McGinn Intellectual Property Law Group, PLLC

(57) ABSTRACT

An electrically-floating light shielding film is formed on a glass substrate, and a signal line is formed above the light shielding film via a gate insulating film. The light shielding film is formed along the signal line, and has a width larger than that of the signal line. On an interlayer insulating film that covers the signal line, transparent electrodes of neighboring pixels are formed, and a reflective electrode extending from the transparent electrode has a frame portion disposed along the signal line. The reflective electrode is formed the interlayer insulating film. The light shielding film does not overlap the transparent electrode in a plan-view perspective and overlaps the reflective portion in a plan-view perspective. The signal line does not overlap the reflective electrode in a plan-view perspective. Hence, a semitransparent liquid crystal display device that suppresses vertical crosstalk and as well maintains a high aperture ratio is obtained.

17 Claims, 13 Drawing Sheets

SEMITRANSPARENT LIQUID CRYSTAL DISPLAY

TECHNICAL FIELD

The present invention relates to a semitransparent liquid crystal display device that suppresses vertical crosstalk.

BACKGROUND ART

Liquid crystal display devices are now widely mounted on various terminals, with their advantages utilized such as thin body, light weight, compact size, low power consumption, etc. Among liquid crystal display devices, active matrix type devices have a pixel electrode and a thin film transistor (TFT) or an active element connected to the pixel electrode in each of the pixel regions defined by signal lines and scanning lines laid in a matrix form. The liquid crystal display element is driven when a predetermined voltage is applied to the pixel electrode via the TFT.

In conventional active matrix liquid crystal display devices, the gap between a signal line and a pixel electrode adjacent to the signal line is small, and so-called vertical crosstalk occurs due to parasitic capacitance that occurs between the signal line and the pixel electrode, leading to a problem that the image quality degenerates.

Compared to this, Patent Literature 1 discloses an electrode structure that reduces parasitic capacitance in a transparent liquid crystal display device. FIG. 13 is a partial cross section of a conventional active matrix substrate described in Patent Literature 1. As shown in FIG. 13, a metal film 102 is formed on a glass substrate 101, and an insulating film 103 is formed to cover the metal film 102 and the glass substrate 101. A source line 104 or a signal line is formed above the metal film 102 via the insulating film 103, and another insulating film 105 is formed to cover the source line 104 and the insulating film 103. A pair of pixel electrodes 106 adjoining each other are formed on the insulating film 105. According to this conventional technique, the edge portions of the metal film 102 and the pixel electrodes 106 overlap when seen in the plan-view perspective, while the widthwise edges of the source line 104 and the pixel electrodes 106 do not overlap in the plan-view perspective.

In this structure, the parasitic capacitance that occurs between the pixel electrodes 106 and the source line 104 series of the capacitance between the pixel electrodes 106 and the metal film 102 and the capacitance between the metal film 102 and the source line 104. Therefore, the parasitic capacitance that influences the pixel electrodes 106 can be reduced. As a result, an effect that contrast improves is obtained.
Patent Literature 1: Unexamined Japanese Patent Application KOKAI Publication No. H5-142570.

DISCLOSURE OF INVENTION

Problem to be Solved by the Invention

However, the above-described conventional art has the following problem.

The conventional transparent liquid crystal display device disclosed in Patent Literature 1 is problematic in that it cannot sufficiently suppress vertical crosstalk, though it succeeds in reducing the parasitic capacitance between the source line and the pixel electrodes by providing the metal film under the source line or the signal line. The intensity of vertical crosstalk can be estimated based on (parasitic capacitance between the signal line and the pixel electrodes)/(liquid crystal capacitance+storage capacitance). There are two reasons for which vertical crosstalk cannot be suppressed. One is that it is not appropriate to provide large storage capacitance in the device because the device is structured as a transparent type. This is because too large storage capacitance decreases the aperture ratio. The other reason is that sufficient light shielding for the edge portions of the pixel electrodes makes the metal film and the pixel electrodes overlap widely and increases parasitic capacitance.

Furthermore, according to the conventional technique disclosed in Patent Literature 1, the metal film is formed on the same layer where the gate line is formed, and light leaks through the gap that necessarily exists between the metal film and the gate line. When used in a transparent type device, this structure requires a black matrix to be formed on the opposing substrate for shielding the leaking light. The black matrix needs to have some margin in order to be overlaid precisely, which raises a problem that the aperture ratio decreases.

The present invention was made in view of the above problems, and an object of the present invention is to provide a semitransparent liquid crystal display device that suppresses vertical crosstalk and at the same time maintains a high aperture ratio.

Means for Solving the Problem

A semitransparent liquid crystal display device according to the present invention is a semitransparent liquid crystal display device including at least: signal lines and scanning lines disposed in a matrix form; a pixel electrode formed in each of pixel regions defined by the signal lines and the scanning lines and having a transparent electrode and a reflective electrode; and a thin film transistor connected to each pixel electrode, and includes: a transparent insulating substrate; a first metal film and a scanning line that are formed on the transparent insulating substrate; a first insulating film that is formed on the transparent substrate and covers the first metal film and the scanning line; a signal line formed above the first metal film via the first insulating film; a second insulating film that is formed on the first insulating film and covers the signal line; a transparent electrode formed on the second insulating film; and a second metal film formed on the second insulating film, wherein the first metal film does not overlap the transparent electrode in a plan-view perspective and overlaps, at its edge, the second metal film in a plan-view perspective, and wherein the signal line overlaps neither the second metal film nor the transparent electrode in a plan-view perspective, and overlaps, at least a portion thereof, the first metal film in a plan-view perspective.

The first metal film may be a metal film that has a light shielding property and is electrically-floating. The second metal film may be a metal film having a light shielding property.

It is preferred that the width of the signal line be smaller than the width of the first metal film. The first metal film may extend along the signal line.

It is preferred that the signal line be covered by the first metal film in a plan-view perspective. A slit may be formed in a portion of the first metal film that overlaps the signal line in a plan-view perspective.

The second metal film may be the reflective electrode that is connected to the transparent electrode. The second metal film may be a frame portion of the reflective electrode that is formed along the circumference of the transparent electrode.

A storage capacitance electrode that forms storage capacitance may be formed on the transparent insulating substrate under the reflective electrode.

It is preferred that (parasitic capacitance between signal line and pixel electrode)/(liquid crystal capacitance+storage capacitance) be 0.05 or lower.

Effects of the Invention

According to the present invention, parasitic capacitance that occurs between the signal line and the pixel electrode is series of the capacitance between the signal line and the first metal film and the capacitance between the pixel electrode and the first metal film, resulting in the parasitic capacitance being smaller than when the first metal film is not provided. This contributes to suppressing vertical crosstalk.

Figure 1:
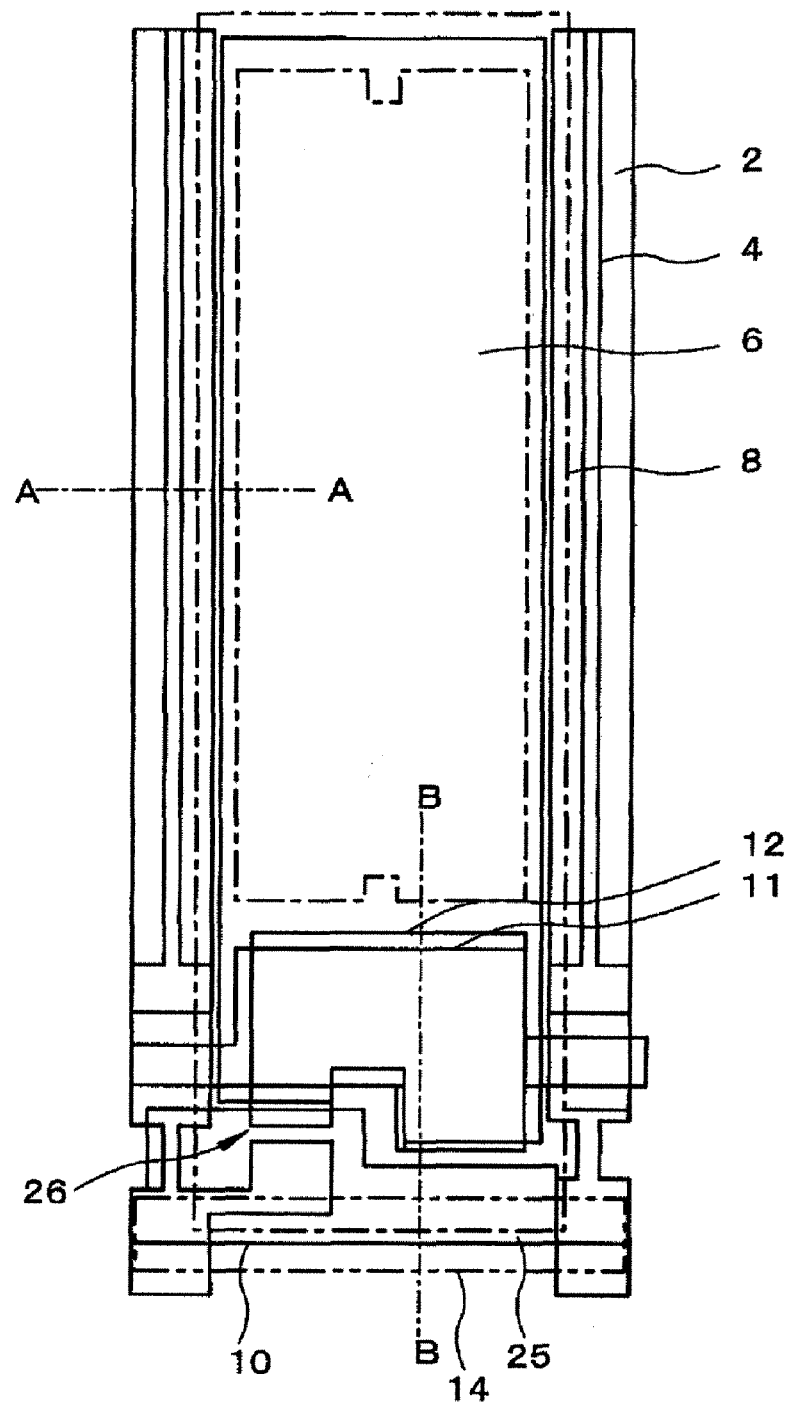
FIG. 1 It is a plan view showing a pixel of a semitransparent liquid crystal display device according to a first embodiment of the present invention.

| Explanation of Reference Numerals | |
|---|---|
| 1, 13 | glass substrate |
| 2 | light shielding film |
| 3 | gate insulating film |
| 4 | signal line |
| 5, 7 | interlayer insulating film |
| 6 | transparent electrode |
| 8 | reflective electrode |
| 9 | slit |
| 10 | gate electrode |
| 11 | storage capacitance electrode |
| 12 | opaque pixel electrode |
| 14 | black matrix |
| 15 | red color layer |
| 16 | green color layer |
| 17 | blue color layer |
| 18 | overcoat layer |
| 19 | opposing electrode |

| Explanation of Reference Numerals | |
|---|---|
| 20 | luminance measurement point |
| 21, 22 | distance |
| 23 | transparent portion cell gap |
| 24 | reflective portion cell gap |
| 25 | scanning line |
| 26 | thin film transistor |
| 27 | liquid crystal layer |
| 28 | color filter |
| 29 | floating electrode (G layer) |
| 30 | organic film |
| 31 | opposing substrate |
| 32 | Al electrode |
| 33 | ITO electrode |
| 101 | glass substrate |
| 102 | metal film |
| 103 | insulating film |
| 104 | source line |
| 105 | insulating film |
| 106 | pixel electrode |

BEST MODE FOR CARRYING OUT THE INVENTION

Figure 2:
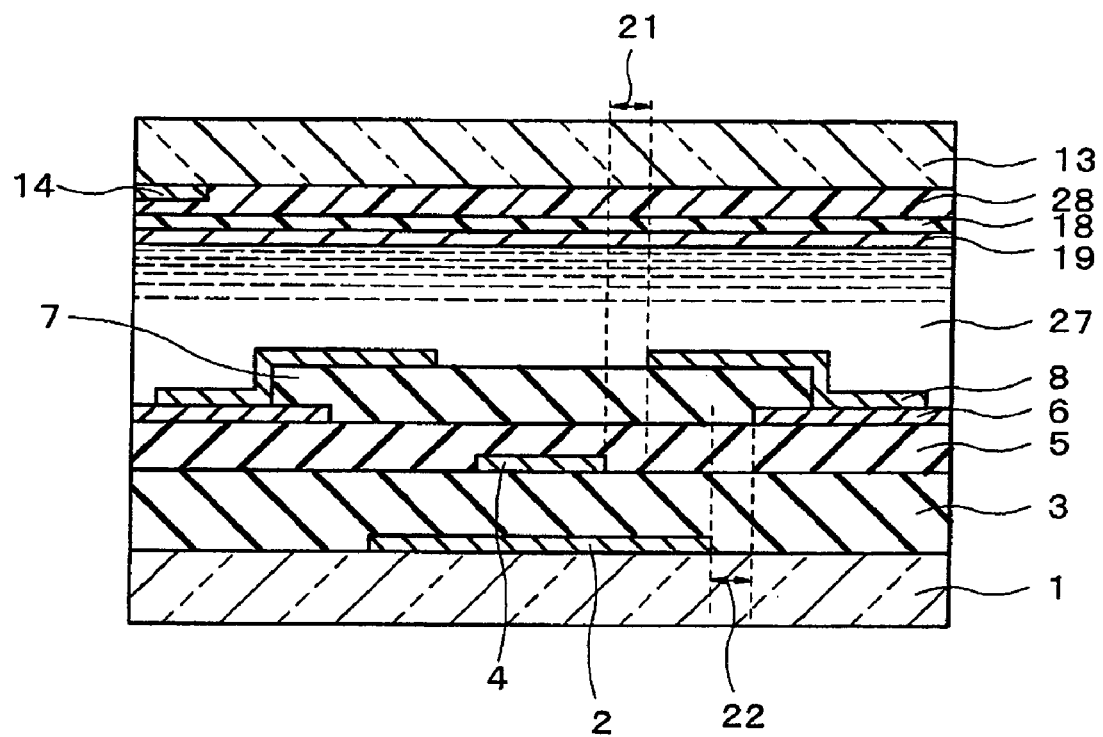
FIG. 2 It is a cross section taken along a line A-A of FIG. 1.
Figure 3:
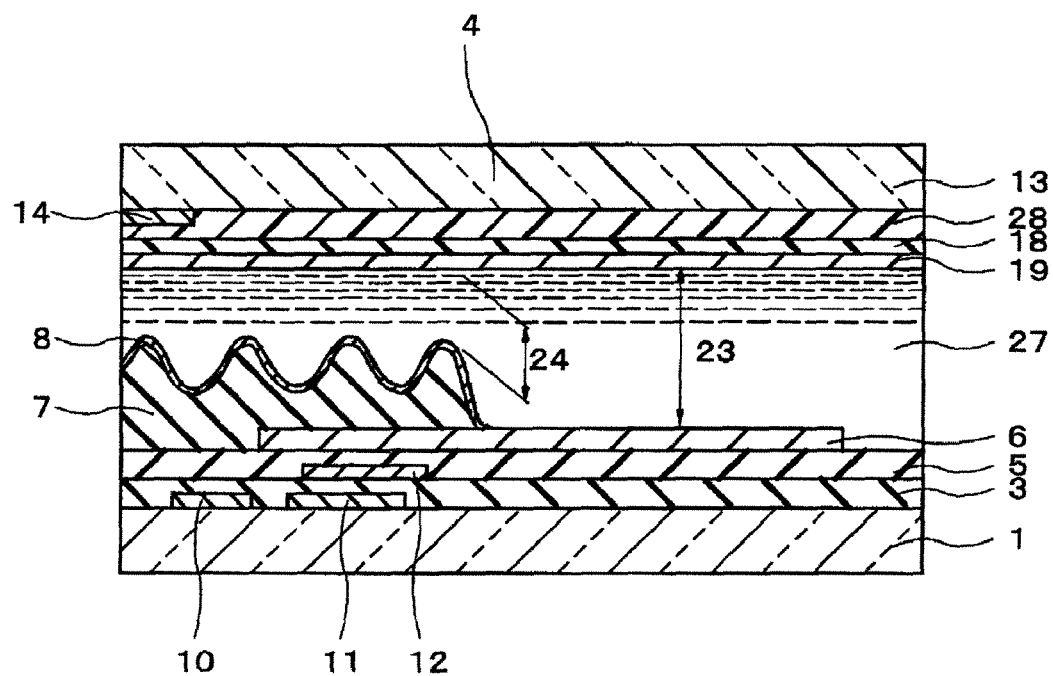
FIG. 3 It is a cross section taken along a line B-B of FIG. 1.

Embodiments of the present invention will be specifically explained below with reference to the attached drawings. To begin with, the first embodiment of the present invention will be explained. FIG. 1 is a plan view showing a pixel of a semitransparent liquid crystal display device according to the first embodiment of the present invention. FIG. 2 is a cross section taken along a line A-A of FIG. 1, and FIG. 3 is a cross section taken along a line B-B of FIG. 1.

According to the present embodiment, as shown in FIG. 1, signal lines 4 and scanning lines 25 are formed to intersect with each other on a glass substrate or a transparent insulating substrate (unillustrated), and pixel electrodes are formed in the regions enclosed by the signal lines 4 and the scanning lines 25. The pixel electrode is constituted by a transparent electrode 6 that allows light to pass, and a reflective electrode 8 that reflects light. The reflective electrode 8 has a frame portion that surrounds the transparent electrode 6, and a part of the frame portion is parallel with the signal line 4. A thin film transistor 26 is formed near the intersection of the signal line 4 and scanning line 25, and the pixel electrode is connected to the thin film transistor 26. A light-shielding black matrix 14 is formed on the scanning line 25.

Next, the A-A cross section of FIG. 1 will be explained with reference to FIG. 2. As shown in FIG. 2, a light shielding film 2 is formed on the glass substrate 1, and a gate insulating film 3 is formed on the glass substrate 1 to cover the light shielding film 2. The light shielding film 2 is an electrically-floating metal film, and made of, for example, chromium (Cr). The signal line 4 is formed on the gate insulating film 3, and the width of the signal line 4 is smaller than the width of the light shielding film 2. In the plan-view perspective, the signal line 4 overlaps the light shielding film 2 and is covered by the light shielding film 2. Further, as shown in FIG. 1, the light shielding film 2 extends along the signal line 4. Hence, the light shielding film 2 shields the signal line 4 against light that proceeds from the lower side of the glass substrate 1 upward. The signal line 4 is made of, for example, Cr.

An interlayer insulating film 5 is formed on the gate insulating film 3 to cover the signal line 4. On the interlayer insulating film 5, the transparent electrodes 6 of neighboring pixels are formed, and the signal line 4 is disposed between these transparent electrodes 6 via the interlayer insulating film 5. The signal line 4 is formed so as not to overlap the transparent electrodes 6 in the plan-view perspective. The transparent electrode 6 is made of, for example, indium tin oxide (ITO). The reflective electrode 8 is connected to and formed on the transparent electrode 6, and this reflective electrode 8 is the frame portion of the reflective electrode shown in FIG. 1. The reflective electrode 8 extends upward from the transparent electrode 6 to be formed on an interlayer insulating film 7 formed on the interlayer insulating film 5. As shown in FIG. 2, in the plan-view perspective, the reflective electrode 8 does not overlap the signal line 4 but does overlap the light shielding film 2 at the edges. The reflective electrode 8 is a metal film made of, for example, aluminum (Al).

The B-B cross section of FIG. 1 will next be explained with reference to FIG. 3. As shown in FIG. 3, a gate electrode 10 integral with the scanning line and a storage capacitance electrode 11 are formed on the glass substrate 1. The gate electrode 10 and the storage capacitance electrode 11 are made of, for example, Cr metallic film. The gate insulating film 3 is formed on the glass substrate 1 to cover the gate electrode 10 and the storage capacitance electrode 11, and an opaque pixel electrode 12 is formed on the gate insulating film 3. The interlayer insulating film 5 is formed on the gate insulating film 3 to cover the opaque pixel electrode 12, and the transparent electrode 6 is formed on the interlayer insulating film 5. The opaque pixel electrode 12 and the transparent electrode 6 are electrically connected through a contact hole (unillustrated). The opaque pixel electrode 12 is a source electrode, and conducts an electric potential supplied by the TFT to the transparent electrode 6. The reflective electrode 8 is connected to the edge of the transparent electrode 6, and extends from the transparent electrode 6 and spreads above the interlayer insulating film 5 where no transparent electrode 6 is formed. The reflective electrode 8 is a metal film having a light shielding property and electrically connected to the transparent electrode 6. Another interlayer insulating film 7 is formed in a region between the reflective electrode 8 and the transparent electrode 6 and interlayer insulating film 5. The storage capacitance electrode 11 and the opaque pixel electrode 12 have substantially the same size as shown in FIG. 1, overlap each other via the gate insulating film 3, and are both disposed below the reflective electrode 8. A liquid crystal layer 27 is formed on the pixel electrode constituted by the transparent electrode 6 and the reflective electrode 8.

A color filter substrate or an opposing substrate counter to the TFT substrate is disposed on the liquid crystal layer 27. Specifically, an opposing electrode 19 is disposed on the liquid crystal layer 27, an overcoat layer 18 is disposed on the opposing electrode 19, and a color filter 28 is disposed on the overcoat layer 18. The color filter 28 is formed by color layers of red, green, or blue. A black matrix 14 is formed at the edge of the color filter 28. As shown in FIG. 1, the black matrix 14 light-shields the region near the scanning line along the boundary between adjacent pixels. A glass substrate 13 or a transparent insulating substrate is disposed on the color filter 28.

Figure 4:
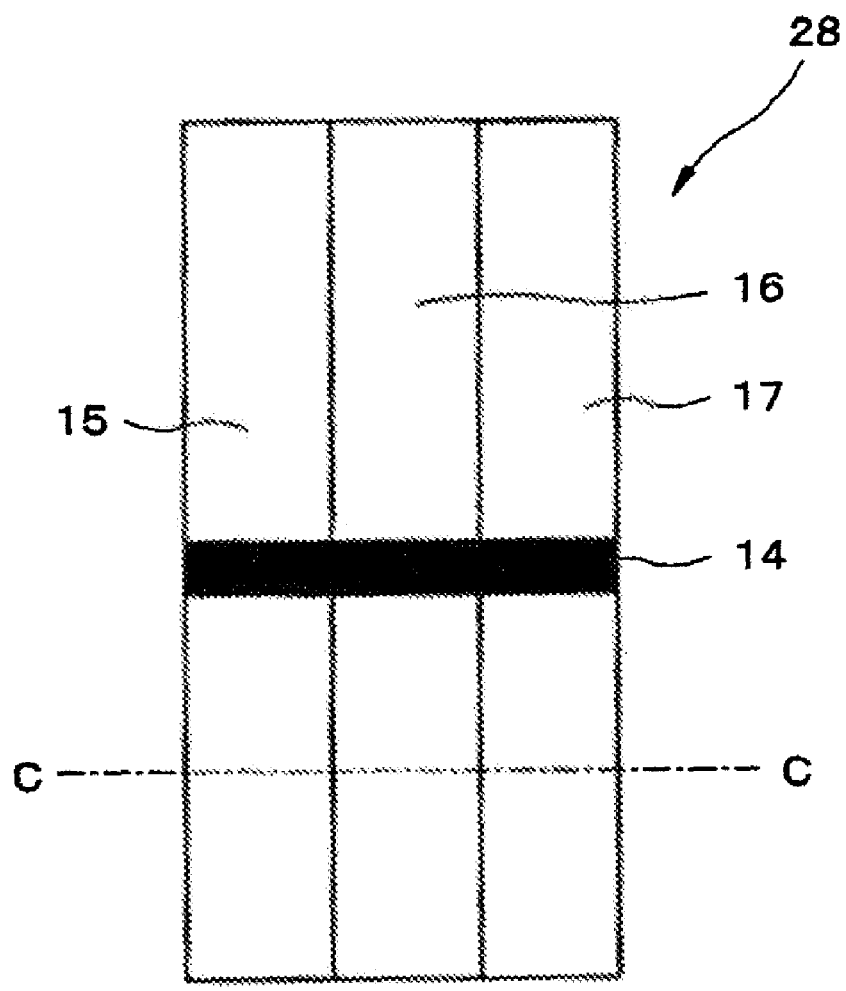
FIG. 4 It is a plan view of a color filter formed on a color filter substrate.
Figure 5:
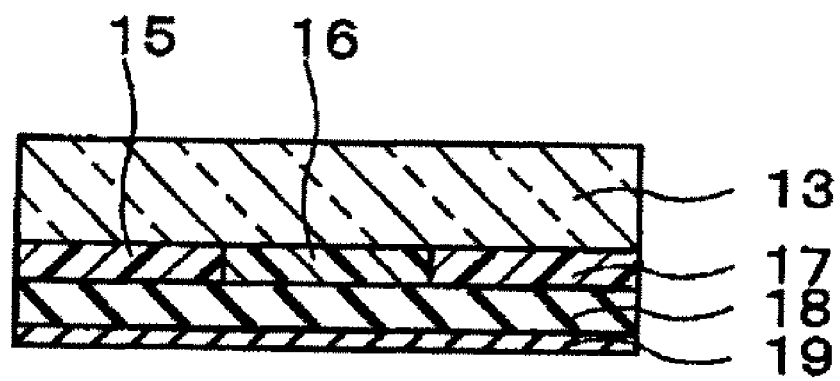
FIG. 5 It is a C-C cross section of FIG. 4.

The planar structure of the color filter substrate is as shown in FIG. 4. FIG. 4 is a plan view of the color filter formed on the color filter substrate. FIG. 5 is a cross section taken along C-C of FIG. 4. As shown in FIG. 4 and FIG. 5, the color filter 28 formed of stripe-shaped red color layer 15, green color layer 16, and blue color layer 17 is formed on a surface of the glass substrate 13 that faces the TFT substrate, and the above-described black matrix 14 is formed between the pixels. The overcoat layer 18 is formed on the color filter 28, and the opposing electrode 19 is formed on the overcoat layer 18. The opposing electrode 19 is a transparent electrode and made of, for example, ITO film.

In the semitransparent liquid crystal display device according to the present embodiment having the above-described structure, a light shielding film made of electrically-floating metal is formed on a layer that exists under the signal line and on which the gate electrode is formed, such that the light shielding film extends along the signal line and has a width larger than the width of the signal line to shield the light on the signal line. The light shielding film does not overlap the transparent electrodes of the neighboring pixels in the plan-view perspective, and the edges of the light shielding film on both sides overlap the edges of the reflective electrodes of the neighboring pixels in the plan-view perspective. The signal line has a line width that is set to be smaller than the interval between the edges of the reflective electrodes of the neighboring pixels, and the signal line, the reflective electrode and the transparent electrode do not overlap in the plan-view perspective. In this structure, parasitic capacitance that occurs between the signal line and the pixel electrode is series of the capacitance between the pixel electrode and the light shielding film and the capacitance between the signal line and the light shielding film, and the parasitic capacitance that influences the pixel electrode can therefore be reduced. Additionally, the edge of the transparent electrode is light-shielded by the light shielding film and the reflective electrode.

According to the present invention, since the parasitic capacitance between the signal line and the pixel electrode can be reduced, vertical crosstalk can be suppressed. The value of vertical crosstalk can be estimated based on (parasitic capacitance between signal line and pixel electrode)/(liquid crystal capacitance+storage capacitance). According to the present embodiment, the estimate is preferably 0.05 or lower. Further, since the edge of the transparent electrode is light-shielded by the reflective electrode and the light shielding film, no black matrix needs to be formed at the corresponding position on the opposing substrate.

Figure 9:
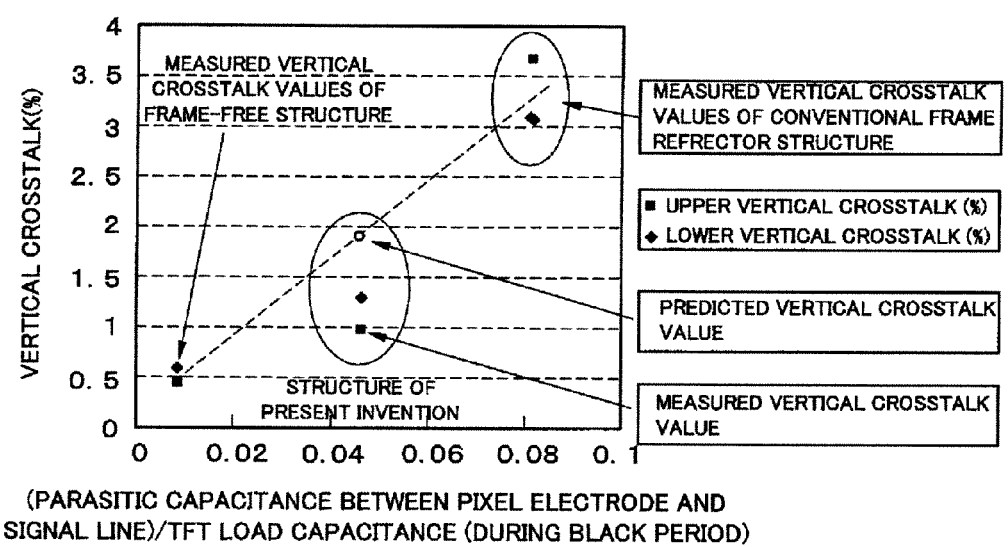
FIG. 9 It is a comparative diagram plotting the relation between (parasitic capacitance between pixel electrode and signal line)/(TFT load capacitance during black period) and vertical crosstalk (%), for each of the structure of the present invention, a conventional frame reflector structure, and a frame-free structure.

As can be known from the above, a semitransparent liquid crystal display device that has a reflective electrode disposed also along the signal line (hereinafter, referred to as frame reflector structure) can have smaller vertical crosstalk if provided with a floating electrode under the signal line as a light shielding layer for the signal line and therearound, than a conventional frame reflector structure provided with no floating electrode can. However, the present invention has a larger vertical crosstalk value than does a structure used in existing devices, in which the transparent electrode and therearound are covered with a storage capacitance electrode (hereinafter, referred to as frame-free structure). FIG. 9 is a comparative diagram plotting the relation between (parasitic capacitance between pixel electrode and signal line)/(TFT load capacitance during black period) and vertical crosstalk (%), for each of the structure of the present invention, a conventional frame reflector structure, and a frame-free structure. Note that TFT load capacitance is the sum of liquid crystal capacitance (pixel electrode capacitance) and storage capacitance. Vertical crosstalk is measured at two positions within a display region, and the values at the two positions are discriminatively plotted in FIG. 9 as "upper vertical crosstalk (%)" and "lower vertical crosstalk (%)" respectively. The measured position corresponding to "upper vertical crosstalk (%)" is the point x indicated by the reference numeral 20 in FIG. 6 (a). A rectangular black region having a size of ¼ the area of the display region is displayed in the center of the display region, and the background is displayed at a gray level. The point x indicated by the numeral 20 is positioned between the upper side of the rectangular black region and the upper side of the display screen. Though unillustrated, the measured position corresponding to "lower vertical crosstalk (%)" is a point located between the lower side of the rectangular black region and the lower side of the display screen. As shown in FIG. 9, the vertical crosstalk values measured from the frame-free structure are about 0.5% at both the "upper" and the "lower" measured positions. As for the structure of the present invention, a predicted vertical crosstalk value is about 1.9%, while the measured vertical crosstalk values are about 1.3% at the "lower" measured position and about 1.0% at the "upper" measured position. The vertical crosstalk values measured from the conventional frame reflector structure are about 3.7% at the "upper" measured position and about 3.1% at the "lower" measured position.

As can be seen, the present invention has larger vertical crosstalk values than does the frame-free structure used in existing devices. However, the frame-free structure, in which the signal line is all along light-shielded by a black matrix, has a smaller effective area of the apertural region, while the present invention having the light shielding film needs not be provided with a black matrix above the signal line and can have a larger effective area of the apertural region. Furthermore, because the storage capacitance is generated underneath the reflective electrode, in a structure in which the size of the reflective electrode is large, the storage capacitance electrode may be made larger to accord to the size of the reflective electrode: this allows reducing the crosstalk values.

Figure 7:
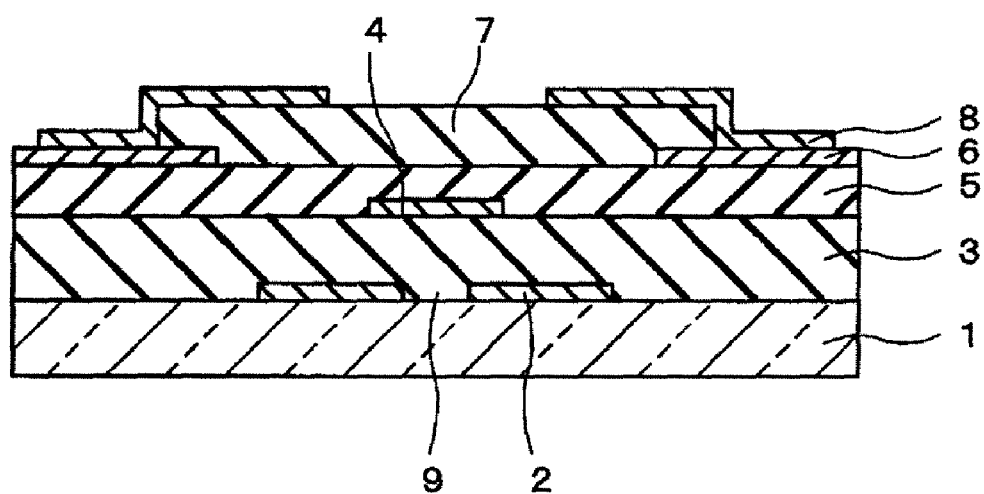
FIG. 7 It is a cross section of a pixel of a semitransparent liquid crystal display device according to a second embodiment of the present invention.

Next, the second embodiment of the present invention will be explained. FIG. 7 is a cross section that shows a pixel of a semitransparent liquid crystal display device according to the second embodiment of the present invention. FIG. 7 is a cross section corresponding to FIG. 2 of the first embodiment.

The difference between the present embodiment and the first embodiment is that the light shielding film 2 has a slit 9 along the signal line 4. As shown in FIG. 7, a slit 9 is formed along the signal line 4 in the center of the light shielding film 2 made of electrically-floating metal film. The width of the slit 9 is smaller than the width of the signal line 4. The present embodiment is the same as the first embodiment in the other aspects, and the components in FIG. 7 that are the same as those in FIG. 2 will thus be assigned the same reference numerals and will not be specifically explained again. As will be explained in the examples to be described later, the present embodiment will further improve the vertical crosstalk values. This can probably be because the slit 9 formed in the light shielding film 2 reduces the capacitance between the signal line and the light shielding film. The other behaviors and effects are the same as those of the first embodiment.

EXAMPLES

Examples of the present invention will be explained below in comparison with comparative examples that depart from the scope of the present invention. A specific structure of an example of the present invention will first be explained with reference to FIG. 1 to FIG. 5. The present example is an equivalent of the specific structure of the first embodiment. A semitransparent liquid crystal display device having a display region, in which each unit element sizes 74.5 μm horizontally and 223.5 μm vertically, and pixels are arrayed 240 units horizontally and 320 units vertically, is formed on a glass substrate 1 in the following manner.

First, a gate electrode 10, a storage capacitance electrode 11, and a light shielding film 2 are formed on a transparent glass substrate 1 from metal film Cr to have a film thickness of 2000 angstrom. The width of the light shielding film 2 in FIG. 2 is 11 μm.

Next, silicon dioxide ($SiO_2$) is deposited to the height of 1000 angstrom and silicon nitride (SiNx) to the height of 4000 angstrom to form a gate insulating film 3. The relative permittivity of $SiO_2$ is 4.0, and that of SiNx is 6.4.

Next, a signal line 4 is formed on the gate insulating film 3 from metal film Cr to have a film thickness of 1400 angstrom. An opaque pixel electrode 12 is also formed on the gate insulating film 3. The opaque pixel electrode 12 will be electrically connected to a transparent electrode 6 in a later step.

Next, an interlayer insulating film 5 is formed from SiNx to have a film thickness of 1500 angstrom. The relative permittivity of the interlayer insulating film 5 is 6.4. A transparent electrode 6 is formed on the interlayer insulating film 5 from ITO. Here, the transparent electrode 6 and the opaque pixel electrode 12 are electrically connected through a contact hole (unillustrated).

Next, an interlayer insulating film 7 is formed from acrylic resin. The relative permittivity of acrylic resin is 3.2. The thickness of the interlayer insulating film 7 is 1.5 μm. A reflective electrode 8 as the reflective portion of each pixel is formed on the interlayer insulating film 7. Metal film Al is used for the reflective electrode 8. The metal film Al is electrically connected to the transparent electrode 6. The area ratio between the transparent portion and the reflective portion is 55:28. A TFT substrate is thus formed in this manner.

Next, a specific structure of a color filter substrate or the opposing substrate to the TFT substrate will be explained. As shown in FIG. 4 and FIG. 5, a color filter 28 in which a black matrix 14 is formed and stripe-shaped red color layers 15, green color layers 16, and blue color layers 17 are formed is formed on a transparent glass substrate 13. An overcoat layer 18 is formed on the color layers, and an opposing electrode 19 is formed thereon from ITO.

Liquid crystal cells are formed with the use of the TFT substrate and the color filter substrate. FIG. 3 shows the cross-sectional structure of a cell. This cross section corresponds to the cross section taken along the line B-B of FIG. 1. Here, a liquid crystal material to be filled between the substrates has a relative permittivity of 9.0 in the longer-axis direction and a relative permittivity of 3.6 in the shorter-axis direction. A transparent portion cell gap 23, i.e., the distance between the transparent electrode 6 and the opposing electrode 19, is 3.8 μm. A reflective portion cell gap 24 or the average distance between the reflective electrode 8 and the opposing electrode 19 is 2.0 μm. A stack of a polarizer, a half-wave plate on the polarizer, and a quarter-wave plate on the half-wave plate is used as a polarizing plate (unillustrated). The half-wave plate provides a retardation of π, and the quarter-wave plate provides a retardation of π/2.

The cross-sectional structure taken along the line A-A of FIG. 1 will be explained with reference to FIG. 2. In FIG. 2, the width of the light shielding film 2 is 11 μm, and the width of the signal line 4 is 3 μm. The distance 21 between the edge of the signal line 4 projected onto the glass substrate 1 and the edge of the reflective electrode 8 projected onto the glass substrate 1 is 2 μm. The distance 22 between the edge of the light shielding film 2 projected onto the glass substrate 1 and the edge of the transparent electrode 6 projected onto the glass substrate 1 is 2 μm. The reflective electrode 8 is formed on the interlayer insulating film 7, but electrically connected to the transparent electrode 6 as sliding down the slope of the interlayer insulating film 7.

Figure 8A:
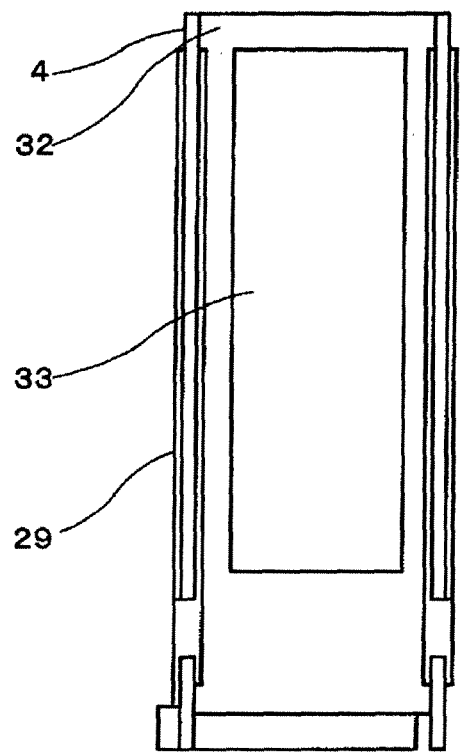
FIG. 8 These are exemplary diagrams showing a pixel structure according to an example of the present invention.
Figure 8B:
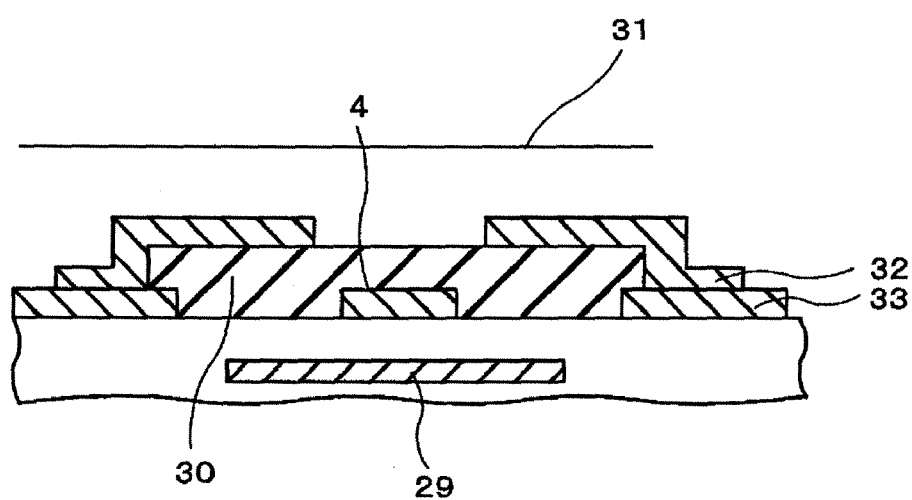

FIG. 8 are exemplary diagrams showing a pixel structure according to an example of the present invention. FIG. 8 (b) corresponds to FIG. 2, which is a cross section of the first embodiment, and (a) corresponds to FIG. 1, which is a plan view. Arrows indicate correspondence relationship between components. As shown in FIGS. 8 (a) and (b), a floating electrode (G layer) 29 corresponding to the light shielding film 2 is formed on the layer on which the gate electrode is formed, and the signal line 4 is formed above the floating electrode (G layer) 29. The floating electrode (G layer) 29 is formed along the signal line 4, and the width of the floating electrode (G layer) 29 is larger than the width of the signal line 4. Formed on the layer on which the signal line 4 is formed are ITO electrodes 33 or transparent electrodes of the neighboring pixels, and an insulative organic film 30 is formed to cover the signal line 4. The organic film 30 corresponds to the interlayer insulating film 7. An Al electrode 32 or a reflective electrode is formed on the organic film 30, and electrically connected to the ITO electrode 33 as sliding down the slope of the organic film 30. The edges of the floating electrode (G layer) 29 on both sides overlap the edges of the Al electrodes 32 of the neighboring pixels in the plan-view perspective. However, the floating electrode (G layer) 29 does not overlap the ITO electrodes 33 of the neighboring pixels in the plan-view perspective. The signal line 4 does not overlap the Al electrodes 32 of the neighboring pixels in the plan-view perspective. The TFT substrate on which these components are formed is topped with an opposing substrate 31 via a liquid crystal layer (unillustrated).

A liquid crystal display device having the structure of the present example described above results in each pixel having the capacitance values shown in Table 1.

TABLE 1

| Item | Capacitance Value |
| --- | --- |
| Integral capacitance of liquid crystal capacitance and storage capacitance (during black display) | 600 fF |
| Pixel electrode-signal line parasitic capacitance | 4 fF |
| Signal line-light shielding film capacitance | 65 fF |
| Pixel electrode-light shielding film capacitance | 34 fF |

The parasitic capacitance between the pixel electrode and the signal line is 26.3 fF, because it is equal to the integral capacitance of a parallel connection in which the pixel electrode-signal line parasitic capacitance is parallel connected with the integral capacitance of a series connection in which the signal line-light shielding film capacitance and the pixel electrode-light shielding film capacitance are serially connected. Note that the pixel electrode-signal line parasitic capacitance is formed between the pixel electrode and the signal line when no light shielding film is provided. The ratio between the parasitic capacitance between the pixel electrode and the signal line and the integral capacitance of the liquid crystal capacitance and the storage capacitance is 0.044:1. That is, (parasitic capacitance between pixel electrode and signal line)/(integral capacitance of liquid crystal capacitance and storage capacitance) is not higher than 5%.

Figure 6A:
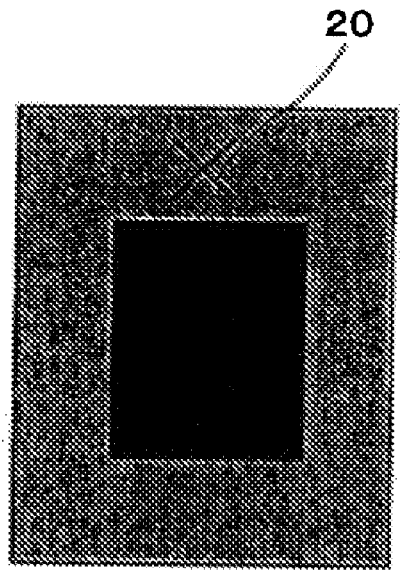
FIG. 6 These show a screen on which vertical crosstalk is measured, where (a) is when a black window is displayed, and (b) is when no black window is displayed.
Figure 6B:
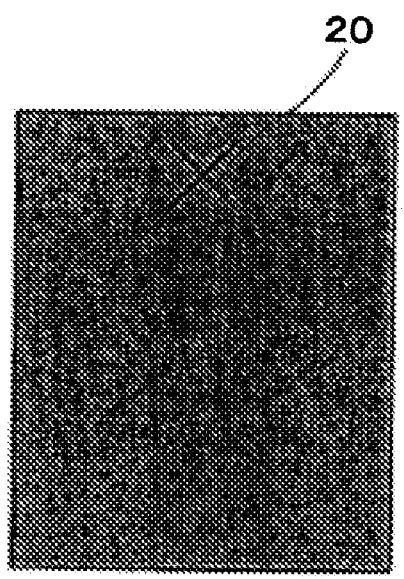

While this liquid crystal display device displays, in the center of its display region, a rectangular black region having a size of ¼ the area of the display region (hereinafter, this state will be described as a black window being present) and displays the background at a gray level as shown in FIG. 6 (a), the luminance at the point x indicated by the reference numeral 20 in FIG. 6 (a) is measured by a luminance meter. Then, while whole the display region is displayed at a gray level (hereinafter, this state will be described as a black window being absent) as shown in FIG. 6 (b), the luminance at the point x indicated by the reference numeral 20 in FIG. 6 (b) is likewise measured.

Provided that a vertical crosstalk value is defined as ((luminance when black window is present)–(luminance when black window is absent))×100/(luminance when black window is absent) (unit: %), the vertical crosstalk value of the present example is 1.2%.

In this liquid crystal display device, the boundary between the signal line electrode and the pixel electrode is light-shielded by the light shielding film and the reflective electrode, and no black matrix therefore needs to be formed on the opposing electrode at the position corresponding to that boundary. This makes it easy to overlay the TFT substrate and the color filter substrate.

Figure 11:
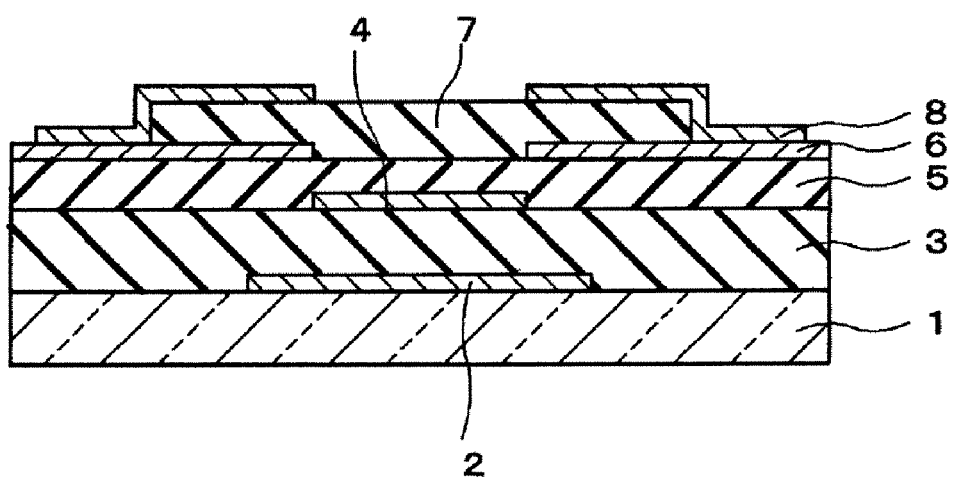
FIG. 11 It is a cross section of a liquid crystal display element of a semitransparent type, as converted from the structure of FIG. 13 with a reflective electrode added.
Figure 13:
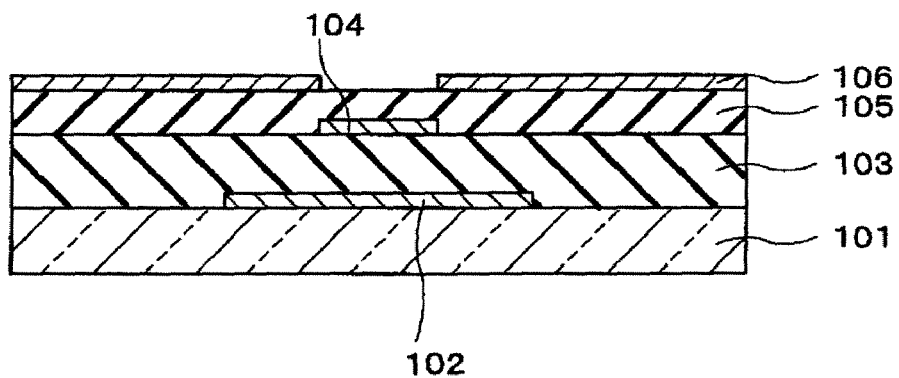
FIG. 13 It is a partial cross section of a conventional active matrix substrate described in Patent Literature 1.

Next, a comparative example 1 will be explained as a comparative example against the present example. FIG. 11 is a cross section of a liquid crystal display element that has the conventional structure shown in FIG. 13, and in addition, an interlayer insulating film 7 and reflective electrodes 8 so that the conventional structure is converted to a semitransparent type. This device is the present comparative example 1. As shown in FIG. 11, a light shielding film 2 is formed on a glass substrate 1, and a gate insulating film 3 is formed to cover the light shielding film 2 and the glass substrate 1. A signal line 4 is formed above the light shielding film 2 via the gate insulating film 3. The light shielding film 2 is made of electrically-floating metal film and formed along the signal line 4 likewise the above example. An interlayer insulating film 5 is formed on the signal line 4 and the gate insulating film 3, and transparent electrodes 6 of neighboring pixels are formed on the interlayer insulating film 5. Reflective electrodes 8 of the neighboring pixels are formed above the interlayer insulating film 5 and the transparent electrodes 6 via an interlayer insulating film 7. The reflective electrode 8 is electrically connected to the transparent electrode 6.

As shown in FIG. 11, the width of the light shielding film 2 is larger than the width of the signal line 4. The width of the signal line 4 is not larger than the distance between the edges of the transparent electrodes 6 of the neighboring pixels, so the signal line 4 does not overlap the transparent electrodes 6 in the plan-view perspective. Likewise, the width of the signal line 4 is not larger than the distance between the edges of the reflective electrodes 8 of the neighboring pixels and the signal line 4 does not overlap the reflective electrodes 8 in the plan-view perspective. The edges of the light shielding film 2 on both sides overlap the edges of the transparent electrodes 6 and reflective electrodes 8 of the neighboring pixels in the plan-view perspective.

This liquid crystal display device has per-pixel capacitance values shown in Table 2.

TABLE 2

| Item | Capacitance Value |
| --- | --- |
| Integral capacitance of liquid crystal capacitance and storage capacitance (during black display) | 600 fF |
| Pixel electrode-signal line parasitic capacitance | 54 fF |
| Signal line-light shielding film capacitance | 56 fF |
| Pixel electrode-light shielding film capacitance | 124 fF |

The parasitic capacitance between the pixel electrode and the signal line is 93 fF, because it is equal to the integral capacitance of a parallel connection in which the pixel electrode-signal line parasitic capacitance is parallel connected with the integral capacitance of a series connection in which the signal line-light shielding film capacitance and the pixel electrode-light shielding film capacitance are serially connected. Note that the pixel electrode-signal line parasitic capacitance is formed between the pixel electrode and the signal line when no light shielding film is provided. The ratio between the parasitic capacitance between the pixel electrode and the signal line and the integral capacitance of the liquid crystal capacitance and the storage capacitance is 0.155:1. Measurement similar to the measurement of the vertical crosstalk in the above example shows that the vertical crosstalk value of the comparative example 1 is 7.8%. In the comparative example 1, since the transparent electrode 6 and the light shielding film 2 directly overlap, the parasitic capacitance is large. This can be considered to be the cause of this large vertical crosstalk value. That is, it is turned out that the vertical crosstalk values can be smaller when the transparent electrode and the light shielding film do not directly overlap as in the above example.

Figure 12:
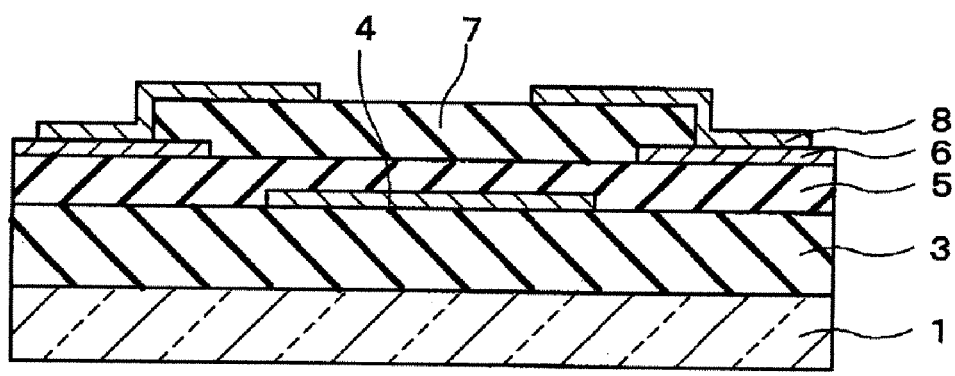
FIG. 12 It is a cross section of a pixel of a liquid crystal display element according to a comparative example 2.

Next, a comparative example 2 will be explained. FIG. 12 is a cross section of a pixel of a liquid crystal display element according to the comparative example 2. The comparative example 2 has the structure of the above example, but without the light shielding film 2. Further, as shown in FIG. 12, the signal line 4 has a large width of 11 μm in order to have a light shielding function by itself. Hence, the edge of the signal line 4 projected onto the glass substrate 1 and the edge of the reflective electrode 8 projected onto the glass substrate 1 overlap by 2 μm. This device is the same as FIG. 2 in the other constructions, so the same components will be assigned the same reference numerals and will not be explained again in detail.

This liquid crystal display device has per-pixel capacitance values shown in Table 3.

TABLE 3

| Item | Capacitance Value |
| --- | --- |
| Integral capacitance of liquid crystal capacitance and storage capacitance (during black display) | 642 fF |
| Pixel electrode-signal line parasitic capacitance | 55 fF |

The ratio between the pixel electrode-signal line parasitic capacitance and the integral capacitance of the liquid crystal capacitance and the storage capacitance is 0.085:1. Measurement similar to the measurement of the vertical crosstalk in the above example is conducted and the vertical crosstalk value of the comparative example 2 turns out to be 3.4%. In the comparative example 2, the parasitic capacitance is large because the pixel electrode and the signal line overlap directly. It is considered that the vertical crosstalk value is large because of this large parasitic capacitance.

Next, an example 2 will be explained. The example 2 has a structure similar to that of the second embodiment, and is characterized in that the light shielding film 2 has a slit 9 as shown in FIG. 7. The width of the slit 9 is 2 μm. The example 2 is the same as the former example in the other constructions. The present liquid crystal display device has per-pixel capacitance values shown in Table 4.

TABLE 4

| Item | Capacitance Value |
| --- | --- |
| Integral capacitance of liquid crystal capacitance and storage capacitance (during black display) | 600 fF |
| Pixel electrode-signal line parasitic capacitance | 2.5 fF |
| Signal line-light shielding film capacitance | 49 fF |
| Pixel electrode-light shielding film capacitance | 31 fF |

The parasitic capacitance between the pixel electrode and the signal line is 21.5 fF, because it is equal to the integral capacitance of a parallel connection in which the pixel electrode-signal line parasitic capacitance is parallel connected with the integral capacitance of a series connection in which the signal line-light shielding film capacitance and the pixel electrode-light shielding film capacitance are serially connected. Note that the pixel electrode-signal line parasitic capacitance is formed between the pixel electrode and the signal line when no light shielding film is provided. The ratio between the parasitic capacitance between the pixel electrode and the signal line and the integral capacitance of the liquid crystal capacitance and the storage capacitance is 0.035:1. Measurement similar to the measurement of the vertical crosstalk in the former example shows that the vertical crosstalk value of the example 2 is 0.55%, which is better than the vertical crosstalk of the former example. This is considered to be because the slit in the light shielding film makes the signal line-light shielding film capacitance smaller.

Figure 10:
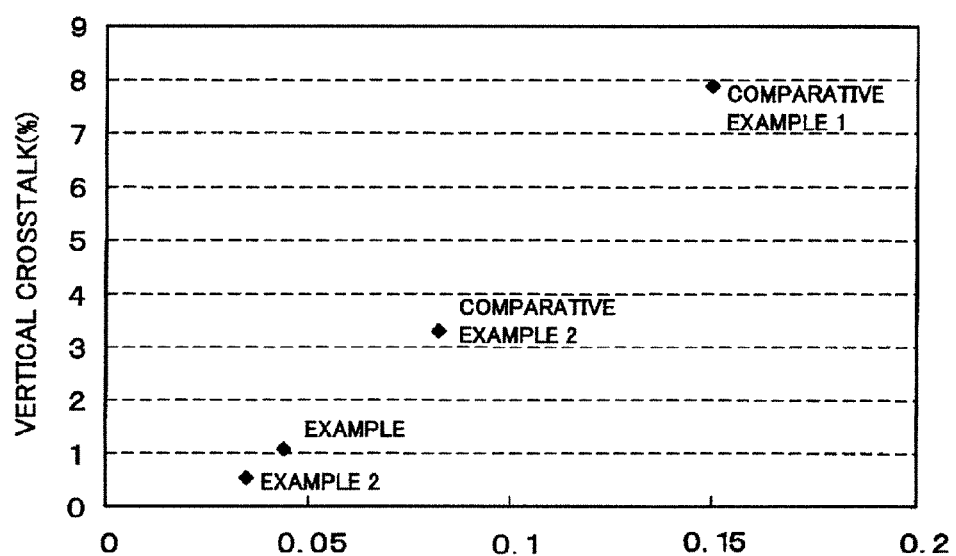
FIG. 10 It is a graph showing comparison among examples and comparative examples in terms of vertical crosstalk (%) values.

FIG. 10 shows the comparison of the effects of the example, the example 2, the comparative example 1, and the comparative example 2. The vertical axis indicates vertical crosstalk (%), and the horizontal axis indicates (parasitic capacitance between pixel electrode and signal line)/(sum of liquid crystal capacitance and storage capacitance). The structure of the present invention can suppress vertical crosstalk.

INDUSTRIAL APPLICABILITY

The present invention is useful as a semitransparent liquid crystal display device.

The invention claimed is:
1. A semitransparent liquid crystal display device, comprising:
    signal lines and scanning lines disposed in a matrix form;
    a pixel electrode formed in each of pixel regions defined by said signal lines and said scanning lines, said pixel electrode including a transparent electrode and a reflective electrode; and
    a thin film transistor connected to each pixel electrode,
    wherein said semitransparent liquid crystal display device comprises:
        a transparent insulating substrate;
        a first metal film and a scanning line formed on said transparent insulating substrate;
        a first insulating film formed on said transparent substrate and covers said first metal film and said scanning line;
        a signal line formed above said first metal film via said first insulating film;
        a second insulating film formed on said first insulating film and covers said signal line;
        a transparent electrode formed on said second insulating film;
        a third insulating film formed to cover a portion of said transparent electrode and said second insulating film; and
        a second metal film formed on said third insulating film,
    wherein said first metal film does not overlap said transparent electrode in a plan-view perspective and overlaps, at its edge, said second metal film in a plan-view perspective,
    wherein said signal line overlaps neither said second metal film nor said transparent electrode in a plan-view perspective, and overlaps, at least a portion thereof, said first metal film in a plan-view perspective, and
    wherein a slit is formed in a portion of said first metal film.
2. The semitransparent liquid crystal display device according to claim 1, wherein said first metal film comprises a metal film that has a light shielding property and is electrically-floating.

3. The semitransparent liquid crystal display device according to claim 2, wherein said second metal film comprises a metal film having a light shielding property.

4. The semitransparent liquid crystal display device according to claim 2, wherein a width of said signal line is less than a width of said first metal film.

5. The semitransparent liquid crystal display device according to claim 2, wherein said first metal film extends along said signal line.

6. The semitransparent liquid crystal display device according to claim 2, wherein said second metal film comprises said reflective electrode connected to said transparent electrode.

7. The semitransparent liquid crystal display device according to claim 2, wherein a storage capacitance electrode that forms storage capacitance is formed on said transparent insulating substrate under said reflective electrode.

8. The semitransparent liquid crystal display device according to claim 1, wherein said second metal film comprises a metal film having a light shielding property.

9. The semitransparent liquid crystal display device according to claim 1, wherein a width of said signal line is less than a width of said first metal film.

10. The semitransparent liquid crystal display device according to claim 1, wherein said first metal film extends along said signal line.

11. The semitransparent liquid crystal display device according to claim 10, wherein said portion of said first metal film overlaps said signal line in a plan-view perspective.

12. The semitransparent liquid crystal display device according to claim 1, wherein said second metal film comprises said reflective electrode that is connected to said transparent electrode.

13. The semitransparent liquid crystal display device according to claim 12, wherein said second metal film comprises a frame portion of said reflective electrode, said frame portion being formed along a circumference of said transparent electrode.

14. The semitransparent liquid crystal display device according to claim 1, wherein a storage capacitance electrode that forms storage capacitance is formed on said film transparent insulating substrate under said reflective electrode.

15. The semitransparent liquid crystal display device according to claim 1, wherein said portion of said first metal film overlaps said signal line in a plan-view perspective.

16. A semitransparent liquid crystal display device, comprising:
    signal lines and scanning lines disposed in a matrix form;
    a pixel electrode formed in each of pixel regions defined by said signal lines and said scanning lines, said pixel electrode including a transparent electrode and a reflective electrode; and
    a thin film transistor connected to each pixel electrode, wherein said semitransparent liquid crystal display device comprises:
    a transparent insulating substrate;
    a first metal film and a scanning line formed on said transparent insulating substrate;
    a first insulating film formed on said transparent substrate and covers said first metal film and said scanning line;
    a signal line formed above said first metal film via said first insulating film;
    a second insulating film formed on said first insulating film and covers said signal line;
    a transparent electrode formed on said second insulating film;
    a third insulating film formed to cover a portion of said transparent electrode and said second insulating film; and
    a second metal film formed on said third insulating film,
    wherein said first metal film does not overlap said transparent electrode in a plan-view perspective and overlaps, at its edge, said second metal film in a plan-view perspective,
    wherein said signal line overlaps neither said second metal film nor said transparent electrode in a plan-view perspective, and overlaps, at least a portion thereof, said first metal film in a plan-view perspective, and
    wherein (parasitic capacitance between signal line and pixel electrode)/(liquid crystal capacitance+storage capacitance) is 0.05 or less.

17. A semitransparent liquid crystal display device, comprising:
    signal lines and scanning lines disposed in a matrix form;
    a pixel electrode formed in each of pixel regions defined by said signal lines and said scanning lines, said pixel electrode including a transparent electrode and a reflective electrode; and
    a thin film transistor connected to each pixel electrode, wherein said semitransparent liquid crystal display device comprises:
    a transparent insulating substrate;
    a first metal film and a scanning line formed on said transparent insulating substrate;
    a first insulating film formed on said transparent substrate and covers said first metal film and said scanning line;
    a signal line formed above said first metal film via said first insulating film;
    a second insulating film formed on said first insulating film and covers said signal line;
    a transparent electrode formed on said second insulating film;
    a third insulating film formed to cover a portion of said transparent electrode and said second insulating film; and
    a second metal film formed on said third insulating film,
    wherein said first metal film does not overlap said transparent electrode in a plan-view perspective and overlaps, at its edge, said second metal film in a plan-view perspective,
    wherein said signal line overlaps neither said second metal film nor said transparent electrode in a plan-view perspective, and overlaps, at least a portion thereof, said first metal film in a plan-view perspective,
    wherein said first metal film comprises a metal film that has a light shielding property and is electrically-floating, and
    wherein (parasitic capacitance between signal line and pixel electrode)/(liquid crystal capacitance+storage capacitance) is 0.05 or less.

* * * * *